Patented Sept. 30, 1952

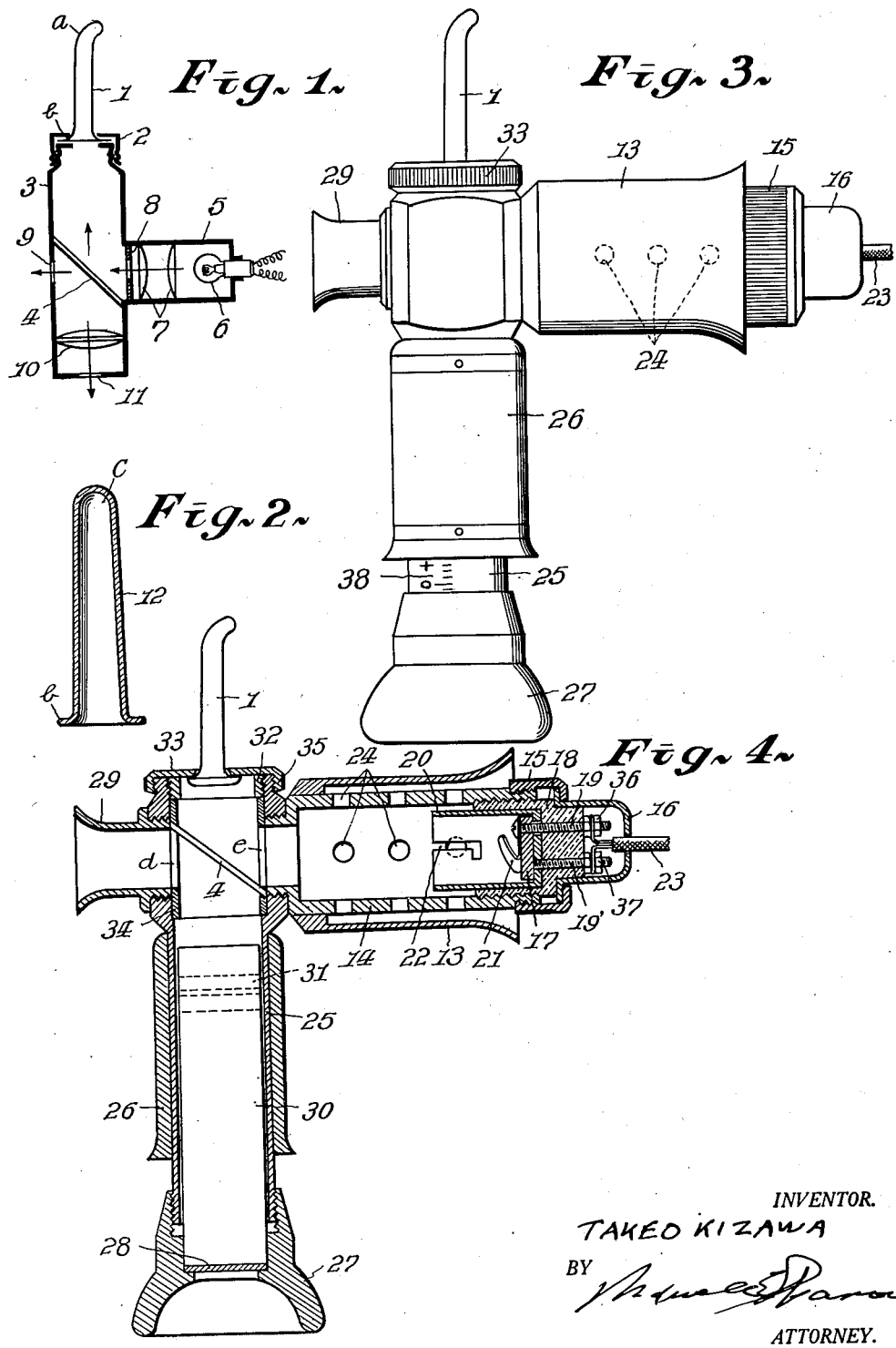

2,612,157

UNITED STATES PATENT OFFICE 2,612,157

APPARATUS FOR DISCRIMINATING THE SEX OF CHICKENS OF HENS AND COCKS AND THE OTHER BIRDS OR FOR INSPECTING THE INTERNAL ORGANS OF ANY BIRDS OR ANIMALS

Takeo Kizawa, Tokyo-to, Japan, assignor to Yugen-Kaisha Sanei Sangyo, Tokyo-to, Japan, a corporation of Japan Application April 2, 1951, Serial No. 218,732
In Japan December 4, 1950

4 Claims. (Cl. 128—3)

The present invention relates to a method or an apparatus for discriminating the sex of chickens of hens and cocks and the other birds or for inspecting the internal organs of any birds or animals.

Hitherto, it is well known at any poultry-farm obtaining eggs to classify the female and male directly after incubation of the eggs and to bring up mainly only the female. But the female and male discrimination of the chicken is very difficult, so that such discrimination has been done usually by persons who were educated specially for several years at any training facilities for discriminating ability and had mastered the discriminating ability. There are, however, very few persons in one country who can gain 100% result of discrimination in spite of skillfulness in discrimination. At the other hand, the usual method for sex discrimination of any birds is so-called anus-discrimination, because the sexual organs of any birds are situated in the abdominal cavity. This method is to inspect the thin warts at the inside of the anus after turning the anus upwardly, because the wart-forms are different in accordance with the hen or cock. There is, however, no clear difference in the wart-forms of the hen and cock and there are rather many kinds of wart-forms and at some time the wart-forms of hen are similar with those of the cocks and also there are some differences individually in the wart-forms of the chickens of same sex, so that discrimination is very difficult.

Furthermore, as is well known, it is very difficult, as it is in the hen and cock, to discriminate chicken-sex of any other birds, for example, of the turkey.

The object of this invention is to provide a method and an apparatus which can discriminate simply and accurately not only the sex of hens and cocks, but also the sex of any other birds and animals, of which sex-discrimination is difficult, without giving any damage to the internal organs and without mastering high ability of discrimination and with 100% exactness.

Furthermore, it is the object of this invention to judge corpulence-order of the ovary and to judge previously the superiority and inferiority of egg-laying ability beside the sex-discrimination of the chicken or to judge healthiness or unhealthiness of the internal organs by using the same method and apparatus.

And a further object of this invention is to provide a method or apparatus which can not only discriminate the chicken sex but also can inspect easily the internal organs of cattle, horses, and dogs and also can judge fertilization or nonfertilization directly after cross-breeding of the said animals.

The method of this invention comprises principally inserting an inserting pipe, of which whole part or special part is transparent, into the rectum and peeping at the sexual organs and the other internal organs through the wall of the rectum. And this invention comprises an apparatus embodying the said method.

This invention may be further understood from the following description with reference to the examples shown in accompanying drawings, but this invention is not restricted within the examples and may be modified in any other embodiments as far as the main idea is not altered.

On the accompanying drawing, Fig. 1 is a fundamental and sectional view of an apparatus embodying the method of this invention. Fig. 2 is a vertically sectioned side view of an inserting pipe differing from the one of the Fig. 1. Fig. 3 is a side view of an actual apparatus which has the actual largeness and was made for sex discrimination of chickens. Fig. 4 is a vertically sectioned side view of the apparatus shown in Fig. 3.

At the Fig. 1, 3 is a main cylinder, 1 is an inserting pipe which is made of any transparent material, for example, glass or synthetic resin and is provided with the curved part $a$ at its head end and with the fixing flange $b$ at its base part, 2 is a ring screwed to the main cylinder 3 and the pipe 1 is supported with the ring 2 by means of fixing the flange $b$ to the ring with any adhesives. 5 is a light source cylinder which is so provided with a light source 6, condenser-lens 7, and an iris plate 8 in its inside so that a parallel light can be projected from the said light source into the main cylinder 3. 4 is a semi-transparent plate arranged slantwise so it can reflect the light coming through the iris plate 8 and can project it into the inserting pipe 1; 9 is a hole for passing the light passed through the plate 4 towards the outside of the cylinder 3 in order to protect excess brightness in the cylinder 3; 10 is a magnifying-lens, and 11 is a peeping aperture made on the main cylinder 3.

In case of discrimination of chicken sex with using the apparatus shown in Fig. 1, at first the light source 6 is connected with an electric source and next the inserting pipe 1 is so inserted into the anus that the surface of the curved part $a$ comes to the position of the sexual organs. Then the rectum wall touching the surface of the curved part $a$ will be lighted by the parallel light bundle projected through the condenser-lens 7 and the iris plate 8. At this time the rectum wall continued with the anus will be expanded somewhat by insertion of the pipe 1 and this wall comes to semi-transparent condition. So that, if any one peeps through the peeping aperture 11, then it is possible to see clearly the sexual organs through the lens 10, plate 4, wall of the pipe 1, and the rectum wall. By such peeping, it is seen that testicles of the cock-chicken are two small balls having largeness of several centimeters and white yellowy color and the ovary of the hen-chicken is large, flat, and dark purplish. So that it is possible to discriminate the sex easily, immediately, and also without special expertness. At this time, if any proper blue-purplish filter is arranged in the light source cylinder 5, then the white-yellow color of the testicles will be more clearly seen.

According to the method and apparatus of this invention, it is easily possible to judge the corpulence-order of the ovary at the same time with the discrimination of the chicken sex and to judge the superiority and inferiority of egg-laying ability. And furthermore it is possible to see not only the sexual organs, but also lungs, kidney, and the other internal organs and to judge easily the vigor-order of living ability or existence or not of illness. Hitherto, it has been perfectly impossible to gain the effects of the said auxiliary judgements. At this fact, this invention is very excellent. At the embodying the apparatus of Fig. 1, it is specially profitable that the diameter of the inserting pipe 1 is most large so far as the rectum wall is not damaged by expansion, because transparency of the rectum wall increases and seeing becomes very clear. As a result of many experiments, if the external diameter is 6 mm., then the rectum wall will be broken, but if it is 5 mm. then such damage would not occur and it is very effective. Of course, the inspection may be done somewhat effectively even when an inserting pipe of 4 mm. external diameter is used.

In case of utilization of 5 mm. inserting pipe, then the pain given to chicken by inserting the pipe into anus is very little in comparison with the case utilizing the well known method of anus discrimination. According to the well known method, if the turned condition of the anus is continued for ten minutes, then the chicken will die. But according to this invention, even when the inserted condition of inserting pipe is continued for several hours, the chicken will easily recover normal living condition after removal of the inserted pipe.

The inserting pipe 1 is not restricted to the form having the curved part as is shown in Fig. 1, but any other pipe, for example, the pipe as is shown in Fig. 2 may be used. But according to such pipe as is shown in Fig. 2, the brilliant light reflected from the curved end part c will be seen as a brilliant point at the peeping aperture and at the other hand some excremental liquid remaining in the rectum (although such liquid is generally taken off) will accumulate on the front of the pipe, so that the peeping is somewhat ineffective. Against such facts, if the pipe as is shown in Fig. 1 is used, then the said reflected light from the curved part a will be projected towards the head end and will not project into eye and also the excremental liquid will not accumulate as is described in the above part, so that the objects can be seen very clearly. In the Figs. 3, 4 is shown an example of the apparatus of this invention which is manufactured trially as an actual apparatus for discrimination of chickens of hen and cock. 25 is a main cylinder screwed at its head end into the cylinder 34. 13 is a grasping cover cylinder fixed to the cylinder 14 by any proper means, 18 is an insulating cover block screwed in the opening mouth of the cylinder 14. 20 is a metallic socket supported in the cover block 18 and connected electrically with a screw-pin 19' as an electrode of the electric lamp. 21 is the another electric contact-piece and this piece is fixed on the block 18 together with the socket 20 through an insulating plate 17 by means of a screw-pin 19 and a nut 36. 23 is a feeding cord connected electrically to the screw-pin 19, 19' with nuts 36, 37 and thus to the contact piece 21 and the socket 20 respectively. 16 is a protecting cap, 15 is a ring tightening cap, 16, 24 are air holes made in the cylinder 14 and 13. 22 is a slot which is so made in the side wall of the socket 20 as to allow insertion of the lamp into itself when the lamp is inserted in the socket 20. 27 is a peeping cap screwed adjustably on the main cylinder 25 and this cap supports a cylinder 30 containing the magnifying-lens device 31 and a peeping glass 28. So that the cylinder 30 can be slid in the main cylinder 25 by adjusting the cap 27 with rotation. According to such construction, the peeping condition can be so adjusted as to let it fit for every one. The peeping glass 28 may be colored properly and the peeping cap 27 may be so made that the position of it can be adjusted by only sliding along the cylinder 25 or by method of telescopic system. 34, 35 are glass cylinders having their ends cut along an inclined surface and these cylinders are so arranged in the cylinder 25 that their inclined surfaces face to each other and a perfect cylinder can be formed. 4 is a semi-transparent plate inserted between the inclined surfaces of both the cylinders 34, 35. d, e are light passing windows which are respectively made to each of the side-walls of the cylinders 34, 35 and the surfaces of these cylinders are so treated that they are very rough. 32 is a ring which is screwed in the inside of the cylinder 25 and can fasten the cylinder 34, plate 4, and the cylinder 35 from above after insertion of these parts in order. 33 is an attaching member which can be screwed detachably on the upper end of the cylinder 25 and can support the inserting pipe 1. The pipe 1 can be fixed at its base flange with any proper adhesives. 29 is a shade protecting the window d and screwed to the main cylinder 25. 38 is a graduation showing the adjusted position of the cap 27.

The operation of the apparatus showed in Figs. 3, 4 is perfectly the same with that of the apparatus as is shown in Fig. 1. Although in the apparatus of Figs. 3, 4 the iris plate is omitted, of course a proper iris plate may be arranged at the end part of the light source cylinder 14 or at the window e of the cylinder 35.

The method and apparatus of this invention can be utilized effectively and easily not only for discrimination of chicken sex of hens and cocks and for inspection of their internal organs, but also for discrimination of chicken sex and sex of any other birds such as turkey and also for judgment of fertilization result directly after cross-breeding of any other animals such as horses, dogs, and cows or for inspection of the internal organs of such animals.

In the embodiment of this invention, there may be used any magnifying device which can magnify the images at the peeping aperture and can show clearly without peeping.

Describing this invention as above, I claim as follows:

1. Apparatus for determining the sex of chickens and other birds which comprises a main cylinder having a viewing aperture at one end, an elongated hollow pipe member closed at one end and mounted at its open end on the other end of said main cylinder for insertion into the rectum of a chicken and formed, at least in the area thereof visible through said viewing aperture, of a transparent material, said area of the pipe member visible through the viewing aperture providing a face for contact with the rectum wall and through which the sexual organs of the chicken may be viewed, a light source cylinder extending laterally from said main cylinder intermediate the ends of the latter and opening into said main cylinder, means in said light source cylinder for projecting light laterally into said main cylinder, a semi-transparent reflecting plate disposed diagonally in said main cylinder in the path of the projected light to reflect the light into said pipe member, and magnifying lens means in said main cylinder in front of said viewing aperture.

2. Apparatus according to claim 1; wherein said main cylinder has an aperture formed in the side thereof opposite said light cylinder to permit the light passing through said reflecting plate to escape from said main cylinder.

3. Apparatus according to claim 1; wherein said pipe is formed with a radial flange at said open end thereof for mounting on said main cylinder.

4. Apparatus according to claim 1; wherein said viewing aperture is embodied in a member adjustable longitudinally relative to said main cylinder.

TAKEO KIZAWA.

REFERENCES CITED

The following references are of record in the file of this patent:

UNITED STATES PATENTS

| Number | Name | Date |
|---|---|---|
| 1,712,866 | Allyn | May 14, 1929 |
| 2,318,687 | Hamlin | May 11, 1943 |

FOREIGN PATENTS

| Number | Country | Date |
|---|---|---|
| 203,784 | Great Britain | Sept. 13, 1923 |